United States Patent [19]

Crossland et al.

[11] Patent Number: 4,799,775
[45] Date of Patent: Jan. 24, 1989

[54] FERROELECTRIC LIQUID CRYSTAL CELLS HAVING A HELICAL LIQUID CRYSTAL STRUCTURE

[75] Inventors: William A. Crossland, Harlow; Anthony B. Davey; Matthew F. Bone, both of Bishop's Stortford, all of England

[73] Assignee: STC PLC, London, England

[21] Appl. No.: 32,760

[22] Filed: Mar. 31, 1987

[30] Foreign Application Priority Data

Apr. 1, 1986 [GB] United Kingdom ............... 8607953

[51] Int. Cl.$^4$ ............................................. G02F 1/13
[52] U.S. Cl. .................................. 350/350 S; 350/349
[58] Field of Search ................ 350/350 S, 346, 349

[56] References Cited

U.S. PATENT DOCUMENTS 4,563,059 1/1986 Clark et al. .................. 350/350 S

FOREIGN PATENT DOCUMENTS 2157451 10/1985 United Kingdom .
2159635 12/1985 United Kingdom .
2163273 2/1986 United Kingdom .

OTHER PUBLICATIONS

'Submicrosecond Bistable Electro-Optic Switching in Liquid Crystals' by N. A. Clark and S. T. Lagerwall, Appl. Phys. Lett., vol. 36 No. 11 pp. 889–901 Jun. 1980.
'Smectic Liquid Crystal Textures and Structures' by G. W. Gray & J. W. Goodby (publ. Leonard Hill, 1984) p. 153.
'Ferroelectric Liquid Crystal Electo-Optics Using the Surface Stabilised Structure' by N. A. Clark, S. T. Lagerwall & M. N. Handschy. Mol. Cryst. Liq. Cryst. 1983, vol. 92 pp. 213–234.
'"Soliton Switch" in Chiral Smetic Liquid Crystals' by P. E. Cladis, H. R. Brand and P. L. Finn, Physical Review A vol. 28 No. 1 pp. 512–514 (Jul. 1983).
'Synthesis, Properties and Applications of Ferroelectric Smetic Liquid Crystals', by J. W. Goodby Ferroelectrics, 1983 vol. 49 pp. 275–284.

Primary Examiner—Stanley D. Miller
Assistant Examiner—Richard Gallivan
Attorney, Agent, or Firm—Lee & Smith

[57] ABSTRACT

Bistable operation of ferroelectric liquid crystal smectic I* or smectic F* display cells is disclosed which uses a greater liquid crystal layer thickness than is achievable with smectic C* material while yet retaining bistability of operation.

4 Claims, 1 Drawing Sheet

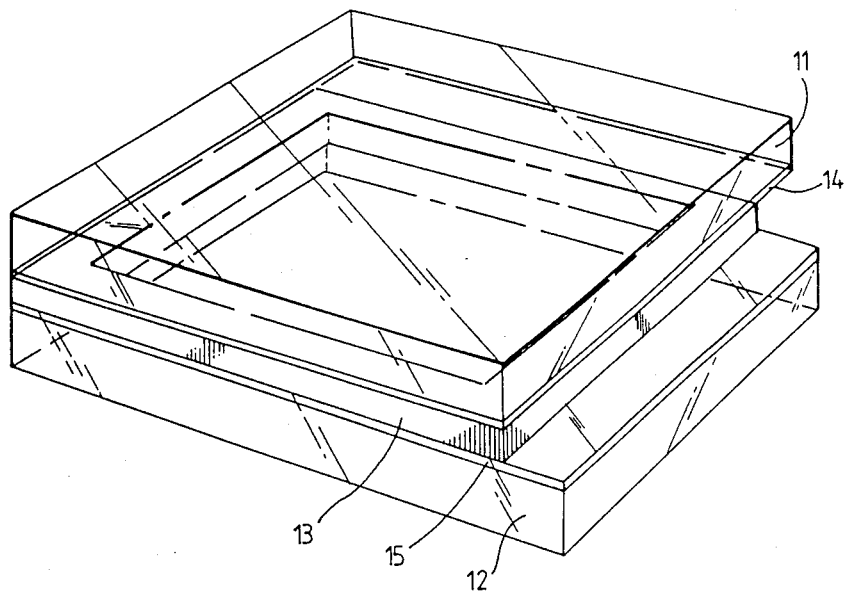

FERROELECTRIC LIQUID CRYSTAL CELLS HAVING A HELICAL LIQUID CRYSTAL STRUCTURE

BACKGROUND OF THE INVENTION

This invention relates to ferroelectric smectic liquid crystal cells.

The first types of liquid crystal cell to be used as display devices employed nematic or cholesteric phases. Those that operated in field effect mode could typically be operated with signal strengths of a few volts, but when the exciting field was removed, the liquid crystal always relaxed back into the same state within a short period of time. Then our UK Patent Specification No. 1557199 described how an electrically addressable non-volatile liquid crystal display can be provided. This employed a smectic A liquid crystal filling to provide bistability of operation. A drawback of this approach was that it required a significantly greater drive voltage. Later, in a paper entitled 'Submicrosecond bistable electro-optic switching in liquid crystals' by N. A. Clark and S. T. Lagerwall appearing in Applied Physics Letters Vol.36 No. 11 pp 889-901 (June, 1980), a bistable cell switchable with smaller voltages was described that employed a ferroelectric smectic C liquid crystal filling.

The terms 'bistable' and 'bistability' are used here and elsewhere in this specification in relation to a situation in which a liquid crystal is electrically switchable between two latching states that are optically distinct on a macroscopic scale so that under appropriate illumination conditions, for instance by direct viewing or by viewing in position between appropriately oriented crossed polarisers, the cell is cable of functioning as a display element electrically switchable between two latched conditions of contrasting appearance.

In order to exhibit ferroelectricity, a smectic material must not only exist in an tilted smectic state such as Smectic C, I or F, but it must also be constituted by a material that is intrinsically chiral, or it must include a chiral constituent to provide chirality. For a definition of the ordering of the different smectic phases, reference may be made to the book entitled 'Smectic Liquid Crystals Textures and Structures' by G. W. Gray and J. W. Goodby, published by Leonard Hill (1984), and in particular to the diagrams appearing on page 153 of that book. According to convention chirality may be signified by an *, and thus the material employed in the Clark and Lagerwall cell may be described as a C* material.

The chirality of a ferroelectric liquid crystal material in a C*, I* or F* phase means that its molecules have a natural tendency to align themselves in progressively different directions in succeeding smectic layers. If the layers are arranged in parallel planes this progression defines a helix, and the pitch of this helix is typically in the region of 2 to 3 microns unless it has been lengthened by diluting the chiral molecules with non-chiral ones or with further chiral molecules of the opposite handedness.

The Clark and Lagerwall paper previously referred to describe the bistable operation of a cell with a 1.5 micron thick layer of DOBAMBC or HOBACPC maintained in a C* phase with its smectic layers aligned in parallel planes perpendicular to the plane of the liquid crystal layer itself. Under these conditions it was observed that the tendency to helical arrangement of the liquid crystal molecules had been suppressed, and the authors attributed the bistable operation they found to this suppression of the helical structure by surface stabilisation.

In a later paper entitled 'Ferroelectric Liquid Crystal Electro-Optics Using the Surface Stabilised Structure' appearing in Mol. Cryst. Liq. Cryst. 1983 Vol. 94 pp 213-234 these authors, in collaboration with M. A. Handschy, report further about work undertaken with such cells, describes the bistability observed in a cell containing a 2 micron thick layer of C* phase DOBAMBC, and in both C* and I* HOBACPC in a cell 1.5 microns thick cell. (In this paper the I* phase of HOBACPC has been incorrectly identified as the F* phase, but this has been corrected in later publications.)

The validity of the theory that the suppression of helix formation is effective in providing bistability of operation has been investigated by ourselves and others. In our work with C* phase material we have been unable to demonstrate any bistability of operation in cells providing a liquid crystal layer thickness of 4 microns or greater even when the pitch of the bulk material filling the cell was several times greater than the layer thickness. This finding is given support in the literature. Thus P. E. Cladis and H. R. Brand, in a paper entitled '"Soliton switch" in chiral smectic liquid crystals', appearing in Physical Review A Vol. 28 No. 1 pp 512-4 (July 1983), report that in their investigations performed using 10 microns thick cells filled with C* phase materials having pitches in the range from 10 to 100 microns they found no evidence of bistability even with switching fields as high as $6 \times 10^5$ V cm$^{-1}$. This paper concludes with the sentence, 'Furthermore, we have demonstrated that, in general, production of samples with a thickness smaller than the pitch does not lead to bistability in chiral smectics'. Similarly in a paper entitled 'Synthesis, Properties and Applications of Ferroelectric Smectic Liquid Crystals' appearing in Ferroelectrics, 1983, Vol. 49 pp 275 to 284, in the section entitled 'Applications', J. W. Goodby states that, 'The smectic phases C*, I* and F* can be used in three different ways. (1) Thin cells, 1-3 microns thick in which the helix is unwound and the cell is bistable. The switching speed from one tilt domain to another is in the microsecond range. Optical contrast is achieved with crossed polarisers. (2) Thick cells where the helix is unwound. The cell is not bistable but the switching speed can still be in the microsecond range. This cell has similar viewing angle properties and contrast to a conventional twisting nematic device. (3) Thick cells where the helix is not unwound. The cell is not bistable and has similar properties to (2)'.

In summary, for C* phase material of any pitch, no bistability of operation has been reported for cells having a liquid crystal layer thickness of greater than 3 microns. Similarly no prior art reports any other type of ferroelectric cell with a liquid crystal layer thickness greater than 3 microns that exhibits bistability of operation. It is believed that, for pitches up at least to several tens of microns, the pitch is unwound when the layer thickness is less than the pitch. It therefore appears that the suppression of pitch is not the paramount factor determining whether or not bistability of operation is exhibited. We believe that bistability is determined by the type of order present in the phase of the material present in the cell.

SUMMARY OF THE INVENTION

The present invention is concerned with ferroelectric liquid crystal cells having liquid crystal layer thicknesses significantly in excess of 3 microns that do exhibit bistability. More particularly the present invention is concerned with the discovery that the behaviour of I* and F* materials is sufficiently different from that of C* materials to allow the essentially bistable operation of I* and F* material filled cells having a liquid crystal layer thickness significantly greater than the limit in the region of 3 microns that is characteristic of known cells employing C* material. This bistability in I* and F* material filled cells does not necessarily require the surface stabilised suppression of the helices by virtue of the thinness of the liquid crystal layer. In the case of I* or F* material it is believed that the unwinding of the helix is a bulk stabilised effect resulting from an extensive three dimensional bond orientational ordering present in such I* and F* materials. The presence of a bulk stabilised effect, rather than a surface stabilised one, may be directly inferred from the observation of the behaviour of pitch lines in a cell whose liquid crystal layer thickness is so great that pitch lines appear or are retained when the cell is cooled into the I* or F* phase in the absence of an applied electric field. When an electric field of sufficient strength is first applied these pitch lines disappear, but when the field is removed they do not immediately reappear. The presence of the pitch lines, before the application of the field, indicates that the layer was not surface stabilised; whereas the absence of pitch lines after removal of the electrical field indicates that stabilisation has been effected by some phenomenon other than surface stabilisation. The surface thus appears to play a secondary role in the bistable operation of these I* and F* cells. Experiments have however revealed that this bistability does not extend indefinitely with liquid crystal layer thickness, but has been shown that at least with certain materials to exist out to thicknesses well in excess of 20 microns.

Initially, as described in United Kingdom Patent Specification No. 2166256A it was thought that it was necessary in order to achieve this stability for both the confining surfaces that define the liquid crystal layer thickness to have been treated to promote planar alignment of the adjacent liquid crystal molecules in the same direction at each of the two surfaces, but it has since been found that planar alignment in a selected direction at only one of these surfaces is adequate and simplifies cell construction by obviating the need to assemble the two confining surfaces not only with those surfaces parallel with respect to each other, but also with a particular orientation of one with respect to the other.

According to the present invention there is provided a ferroelectric liquid crystal cell exhibiting bistability of operation, which cell has a smectic I* or F* phase liquid crystal layer confined between opposed electroded plates only one of whose inward facing surfaces have been treated to promote planar alignment of the adjacent liquid crystal molecules in a selected direction, which plates serve to define the thickness of the liquid crystal layer, said thickness being in the range from 4 to 40 microns.

Generally, it is preferred to employ a liquid crystal layer thickness of less than 20 microns.

The invention also provides a ferroelectric liquid crystal cell exhibiting bistability of operation, which cell has a smectic I* or F* phase liquid crystal layer confined between opposed electroded plates only one of whose inward facing surfaces have been treated to promote planar alignment of the adjacent liquid crystal molecules in a selected direction, which plates serve to define a liquid crystal layer with bulk stabilised molecular alignment.

Optionally a pleochroic dye may be dispersed in the liquid crystal layer.

BRIEF DESCRIPTION OF THE DRAWING

There follows a description of cells embodying the invention in preferred forms. The description refers to the accompanying drawing which depicts a schematic perspective view of the display cell.

DETAILED DESCRIPTION OF THE PREFERRED EMBODIMENT

A hermetically sealed envelope for liquid crystal layer is formed by securing together two glass sheets 11 and 12 wtih a perimeter seal 13. The inward facing surfaces of the two sheets carry transparent electrode layers 14 and 15 of indium tin oxide, and one of these electrode layers is covered within the display area defined by the perimeter seal with a polymer layer, such as polyimide (not shown), provided for molecular alignment purposes. The thickness of the liquid crystal layer contained within the resulting envelope is determined by the thickness of the perimeter seal, and control over the precision of this may be provided by a light scattering of short lengths of glass fibre (not shown) of uniform diameter distributed through the material of the perimeter seal. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed.) The filling operation is carried out with the filling material heated into its isotropic phase so as to reduce its viscosity to a suitably low value. It will be noted that the basic construction of the cell is similar to that of for instance a conventional twisted nematic, except of course for the fact that only one of the rubbing directions 15 is used. For one example the liquid crystal filling of a 10.7 micron thickness cell was the chiral ester

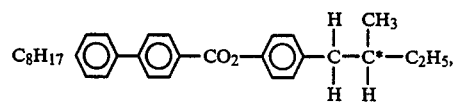

this material being marketed by BDH under the designation CE8. When heating this material from the crystalline state the following transition temperatures were noted:

| | |
|---|---|
| Smectic J* to Smectic I* | 67° C. |
| Smectic I* to Smectic C* | 70.3° C. |
| Smectic C* to Smectic A | 80.7° C. |
| Smectic A to Cholesteric | 135° C. |
| and Cholesteric to Isotropic | 140° C. |

When, after filling, the cell was slowly cooled the planar alignment inducing nature of the rubbed polyimide surfaces caused the alignment of the smectic layers formed on entering the smectic A phase to be in planes normal to the rubbing direction, and hence perpendicular to the planes of the major surfaces of the liquid crystal layer. This alignment of the smectic layers was maintained as the liquid cooled into the smectic C* phase even though the orientations of the molecules within those smectic layers changed upon entering the C* phase. At this stage pitch lines could be observed. This indicated that the cell was too thick for unwinding the helix solely by surface effects. This was to be expected since the liquid crystal layer thickness was considerably greater than the helix pitch (about 2 microns for this material in the C* phase). A slight change of scale in the pitch lines (c. 10%) was observed when, upon further cooling, the filling entered the I* phase.

In a series of comparative tests upon I* and F* filled cells with only one alignment layer instead of two it was found that their properties were substantially indistinguishable from those of the I* and F* material filled cells as described in Specification No. 2166256A to which reference has already been made and to which attention is particularly directed.

We claim:

1. A ferroelectric liquid crystal cell exhibiting bistability of operation, which cell has a smectic I* or F* phase liquid crystal layer confined between opposed electroded plates only one of those inward facing surfaces have been treated to promote planar alignment of the adjacent liquid crystal molecules in a selected direction, which plates serve to define the thickness of the liquid crystal layer, said thickness being in the range from 4 to 40 microns, and being of a sufficient magnitude such that a helical arrangement of the liquid crystal molecules of said liquid crystal layer is obtained when said layer is cooled in the absence of an applied electric field into said smectic I* or F* phase from a less-ordered phase that is not an inclined smectic phase.

2. A ferroelectric liquid crystal cell as claimed in claim 1, wherein a pleochroic dye is dispersed in the liquid crystal layer.

3. A ferroelectric liquid crystal cell as claimed in claim 1, wherein the liquid crystal layer thickness is less than 20 microns.

4. A ferroelectric liquid crystal cell as claimed in claim 3, wherein a pleochroic dye is dispersed in the liquid crystal layer.

* * * * *